United States Patent [19]

Orth

[11] 4,034,563

[45] July 12, 1977

[54] LOAD SENSITIVE HYDRAULIC SYSTEM

[75] Inventor: Harold R. Orth, Hinsdale, Ill.

[73] Assignee: International Harvester Company, Chicago, Ill.

[21] Appl. No.: 709,349

[22] Filed: July 28, 1976

[51] Int. Cl.² .................. F16H 39/46; F15B 13/06
[52] U.S. Cl. .................. 60/422; 60/427; 60/484; 91/412
[58] Field of Search ............ 60/420, 422, 423, 427, 60/484; 137/100, 101, 115; 91/412

[56] References Cited

U.S. PATENT DOCUMENTS

| 3,628,558 | 12/1971 | Bahl | 60/422 X |
| 3,750,405 | 8/1973 | Lech et al. | 60/422 |

*Primary Examiner*—Edgar W. Geoghegan
*Attorney, Agent, or Firm*—Douglas W. Rudy; Floyd B. Harman

[57] ABSTRACT

A load sensitive hydraulic system having a variable displacement pump, a priority dependent work circuit, at least one secondary work circuit, priority means preferencing fluid flow to the priority dependent work circuit over the secondary work circuit, flow and pressure compensating means responsive to requirements of either work circuit for controlling displacement of the variable displacement pump and a relief valve, when overriden, allowing fluid flow to the secondary work circuit.

7 Claims, 2 Drawing Figures

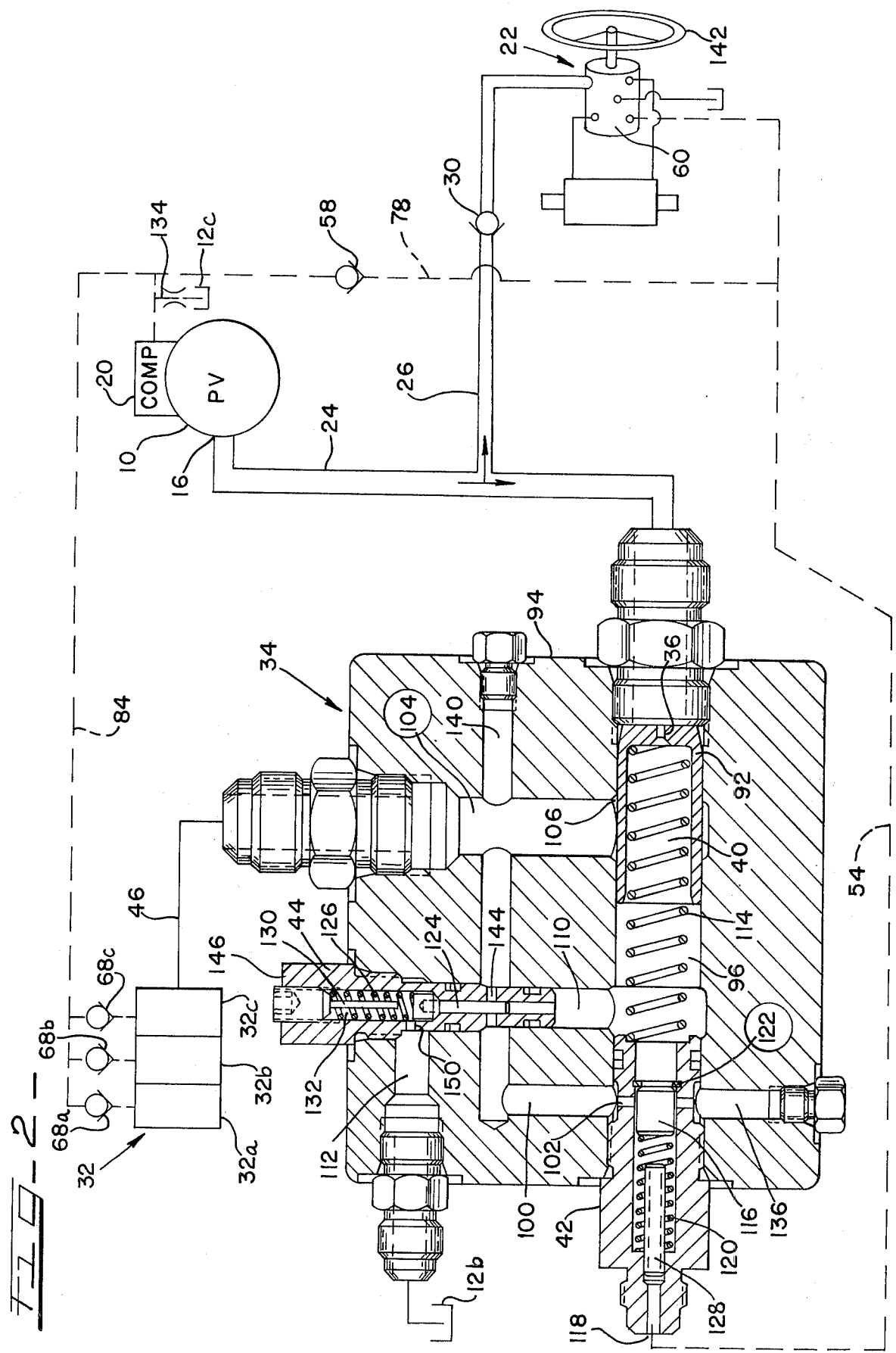

LOAD SENSITIVE HYDRAULIC SYSTEM

BACKGROUND OF THE INVENTION

This invention relates to the use of a variable displacement hydraulic pump in a load sensitive hydraulic system. The hydraulic system will utilize a variable displacement hydraulic pump to supply fluid to a priority dependent work circuit and to at least one other secondary hydraulic work circuit. Priority means are incorporated to assure that the priority dependent work circuit will be supplied with required fluid at necessary volume and pressure before the secondary work circuit requirement is fulfilled.

This invention is an improvement over prior developments in load sensitive hydraulic circuitry making these prior embodiments more adaptable to applications having utility in many fields. A prior U.S. Pat. (No. 3,750,405 to R. J. Lech, et al., Aug. 7, 1973), assigned to the same assignee as the instant invention and herein incorporated by reference, discloses the type of hydraulic system that would be subject to improvement through the utilization of the instant invention. Also, an article appearing in the September, 1975 issue of "Automotive Engineering" magazine entitled "Load-Sensitive Hydrostatic Steering—A New Approach" based on S.A.E. paper 750806 by J. L. Rau shows the state of the art using the apparatus set forth in the above mentioned patent.

The instant invention is an improvement to the state of the art yielding a result that makes load sensitive steering, as well as other priority dependent systems useful and workable in actual applications by overcoming a major deficiency in the contemporary art.

The undesirable feature not alleviated in the referred to patent or the periodical article is a tendency of the primary or priority dependent circuit to recoil or kick back when a secondary work circuit is opened while high pressure is needed in the primary or priority dependent circuit. This has been one factor deleterious to the wide spread use of load sensitive priority circuits. The reason for the kickback or recoil has been difficult to discover and has further required several years of engineering development to reach a solution to the problem.

The instant invention eliminates the bothersome recoil or kickback and will make the acceptance of load sensitive hydaulics in priority dependent circuits more wide spread and more applicable to a diverse plurality of applications.

Among these applications is the use of the flow sensitive hydraulic system in farm tractors where a single pump may be utilized to provide fluid to such devices as, but not limited to, a steering unit, a brake unit, a hydraulic hitch as well as secondary circuits for other hydraulic devices such as implement motors, fan drive motors and bucket attachment motors (cylinders), as well as other secondary hydraulic systems and apparatus. The vehicle control devices generally must have priority of hydraulic fluid allocation for safety reasons. Often the fluid power required by primary circuits is of a variable flow rates at various pressures while still having priority over the secondary circuits.

The use of the variable displacement load sensitive system is desirable as this system provides fluid at demanded rates without the waste of power not needed by the operating hydraulic systems.

SUMMARY OF THE INVENTION

This invention comprises a load sensitive hydraulic system using a variable displacement pump, two or more hydraulic circuits and appropriate controls therein to insure that the power developed and the fluid delivered by the variable displacement pump is equivalent to the power requirements of the hydraulic system and not in excess thereof. At least one hydraulic circuit is a priority dependent (or primary) circuit while the other circuits may be secondary circuits receiving fluid only when the needs of the primary circuit are fulfilled. Also, the primary and secondary circuits have flow and pressure controls for insuring that the variable displacement pump generates sufficient fluid to match the requirements of both the primary and secondary hydraulic circuits. Most important to this disclosure is the utilization of fluid pressure being relieved from a pressure relief valve to feed into the secondary work circuit rather than to the usual reservoir.

It is among the advantages of the instant invention to provide a load sensitive hydraulic fluid circuit that can control and equalize the fluid required and delivered to a plurality of work circuits including a priority dependent circuit and secondary circuits without generating undesirable kickball or recoil forces in a priority dependent circuit when a secondary circuit is opened.

A further object of this invention is to provide a load sensitive circuit that minimizes power loss, heat generation and hydraulic fluid depletion during operation of the priority dependent circuit.

Also an object of this invention is to eliminate the need for extremely close tolerance machining and component sizing as is the case with state of the art devices.

DESCRIPTION OF THE DRAWINGS

The instant invention will be appreciated by a perusal of the following specification and claims when related to the accompanying drawings in which:

FIG. 2 is a combination diagram showing the hydraulic circuit in cutaway and graphical representations.

DETAILED DESCRIPTION OF THE DRAWINGS

Figure 1:
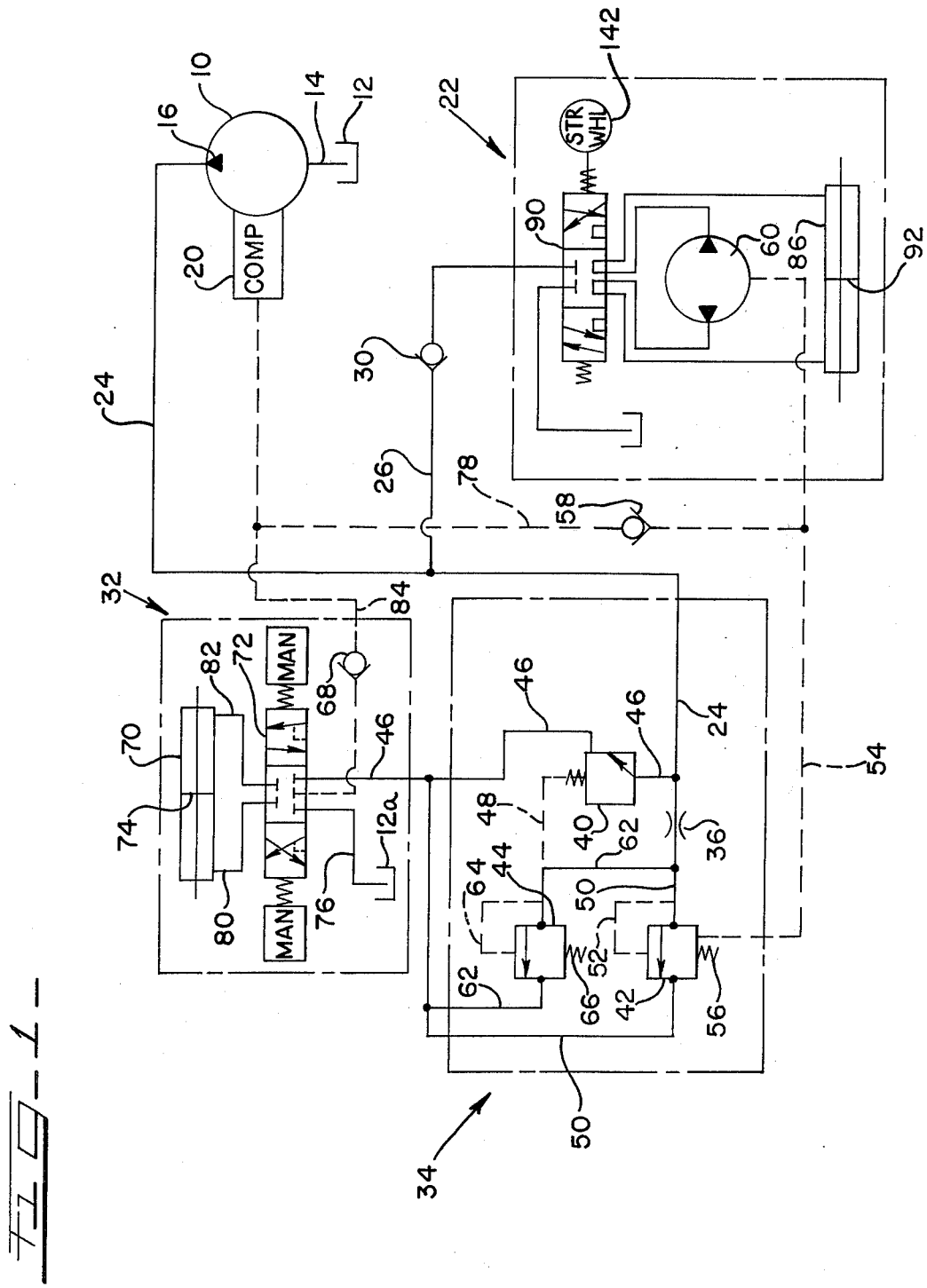
FIG. 1 is a standard graphical presentation of the load sensitive hydraulic circuit of this invention.

FIGS. 1 and 2 present the identical invention, however, FIG. 2 more clearly shows the actual configuration of several of the components. In both figures like reference characters represent like parts.

In FIG. 1 the load sensitive hydraulic circuit depends on the variable displacement pump 10, receiving fluid from reservoir 12 through conduit 14 and delivering fluid under pressure through output port 16. The variable displacement pump 10 is equipped with a compensator 20 for controlling the stroke or the displacement and thus the output thereof.

The variable displacement pump 10 may supply fluid to various work circuits including a priority circuit such as the steering circuit generally 22. Fluid is delivered to the steering circuit 22 via conduits 24 and 26. A first one-way check value 30 allows the passage of fluid from the variable displacement pump 10 to the steering circuit 22 and restricts flow in the opposite direction. The use of this one-way check valve is optional and is not mandatory for the correct operation of the device hereinafter disclosed.

Fluid under pressure may also be delivered to a secondary work circuit, generally 32, after this fluid passes through a flow compensating priority valve generating 34.

Flow compensating priority valve 34 consists of several components including an orifice 36, a priority spool valve 40, an isolator valve 42 and a relief valve 44. Fluid may pass through the priority spool valve 40 when opened from conduit 24 via conduit 46 (teed into conduit 24) to deliver fluid to the secondary work circuit 32.

Fluid may also pass through isolator valve 42 via conduit 50 and join conduit 46 for subsequent delivery to the secondary circuit 32. Isolator valve pilot line 52 may communicate the presence of pressure in conduit 50 of sufficient magnitude to initiate flow through the isolator valve 42. A steering signal line 54 assists isolator valve spring 56 in maintaining a closed position when there is pressure in the steering signal line 54 from displacement of fluid by the hand pump 60 of the steering circuit 22. The steering signal line 78 also communicates the steering signal to the compensator 20 of the variable displacement pump 10. The relief valve 44 may allow passage of fluid from conduit 24 via conduit 62 to conduit 50 when urged open through pressure transmitted through relief valve pilot line 64 sufficient to overcome the pressure of relief valve spring 66.

The secondary work circuit 32 may consist of a motor and control valve as shown. The motor in this case is a double acting cylinder 70 connected to a control valve spool 72 of the closed center type which may be manually operated to allow displacement of the cylinder piston 74 in a conventional manner. The control valve spool 72 allows fluid to pass from the conduit 46 to either side of the cylinder 70. Fluid being displaced from the cylinder 70 will be directed by the control valve spool 72 to the reservoir 12a via conduit 76. Conduits 80 and 82 allow fluid communication between the cylinder 70 and the control valve spool 72. Secondary circuit signal line 84 having one-way valve 68 allows communication of pressure from the displaced control valve spool to the compensator 20 of the variable displacement pump 10. A check valve 58 prevents the secondary circuit signal from affecting the action of the isolator valve 42.

The steering circuit 22 is generally conventional. It may be of the type incorporating a hand pump 60. A steering cylinder 86 is provided with fluid under pressure as directed to it in an appropriate conventional manner from the steering control valve 90. A steering wheel 142 may be used as an input device to direct the displacement of the steering control valve 90 and the attendant displacement of the steering cylinder piston 92 in the steering cylinder 86. This of course is associated with appropriate hardware to provide steering of the vehicle.

FIG. 2, as previously disclosed, is identical to FIG. 1 in operating principle, however, details of the flow compensating priority valve are set forth in a cutaway presentation.

Already set forth are the variable displacement pump 10, its compensator 20, the steering circuit 22, the first one way check valve 30, the secondary work circuit 32, the flow compensating priority valve 34, as well as fluid delivery conduits 24, 26, 46, and pressure sensing pilot lines 84, 54, and 78.

Several details are somewhat different in FIG. 2 and present alternative embodiments, however, the operation of the instant invention yields identical results in each case. For instance, the secondary work circuit generally 32 in FIG. 2 is comprised of three individual work circuit modules 32a, b, and c having individual one-way valves 68a, 68b, and 68c, which may represent three secondary work circuits on a vehicle such as a farm tractor. Flow compensating priority valve 34 is shown as a single valve block in FIG. 2 thus conduits 50, 62, 24, of FIG. 1 are shown as passages with new reference characters in FIG. 2. The orifice 36 of FIG. 1 is placed integral with the priority spool 92 of the priority spool valve portion of the flow compensating priority valve generally 34.

Details of the flow compensating priority valve 34 are clearly shown in FIG. 2. The valve body 94 contains, in passage 96, the priority spool 92, having orifice 36, and the isolator valve 42. Passage 100 allows fluid flow from the isolator valve outlet port 102 to the discharge passage 104 which also may receive fluid flow from passage 96 when the priority spool 92 is displaced to the left in passage 96 sufficiently for to uncover annular orifice 106. Discharge passage 104 is associated with conduit 46 to allow fluid flow to the secondary work circuit 32. Relief valve passage 110 may allow fluid communication between passage 96 and passage 100 upon opening of the relief valve 44. Passage 112 allows leakage past the relief valve to return to reservoir 12b.

The priority spool 92 is urged to a position to block annular orifice 106 by a priority spool spring 114.

The isolator valve spool 116 is urged into position to block isolator valve outlet port 102 by isolator valve spring 120. Snap ring 122 limits the travel of isolator valve spool 116 in one direction while the pin 128, which has an axial passage through it prevents the isolator valve spool from compressing the isolator valve spring 120 into a coil bound condition.

The relief valve 44 is responsive to fluid pressure in relief valve passage 110 and relief valve spool 124 will be urged against relief valve spring 126 due to this force. Stop pin 130 is provided to limit the displaced travel of the relief valve spool 124 to prevent coil contact in the spring. The relief valve 44 may be adjusted by varying the compressed length of the spring 126 in the bore 132.

Passages 136 and 140 are not functional but are the result of machining the valve body 94 for passage 100.

FIG. 2 also shows a metered line 134 from the signal lines 84 and 78 to the reservoir 12c.

MODE OF OPERATION

The following example of the operating characteristics of the load sensitive flow compensating priority system of this invention sets forth the basic operation of the device. FIG. 2 is utilized in this explanation.

The variable displacement pump 10 will produce higher output pressure at its output port 16 than the signal it receives at the compensator 20 up to a maximum pressure of, for instance, 2500 psi. Assume about 250 psi output pressure more than signal, but when the variable displacement pump is at maximum pressure the input signal will be equal to this value. The priority spool spring 114 and the isolator valve spring 120 are set to provide a total pressure drop through their associated valves of slightly less than the 250 psi pressure differential between the variable displacement pump output and the compensator signal input. The relief valve 44 is set to open at something less than the output potential of the variable displacement pump for instance in this example it is set for 2200 psi.

In operation (referring to FIG. 2), when pressure is required in the secondary circuit 32 fluid from the variable displacement pump will pass through conduit 24, through orifice 36 in priority spool 92 and push the isolator valve spool 116 past the isolator valve outlet port 102' The fluid will then pass through passage 100, around the relief valve 44 through discharge passage 104 and to the appropriate work circuit 32 via conduit 46. The orifice 36 causes a pressure drop and the pressure downstream from the priority spool 92 is less than that entering the flow compensating priority valve 34 through conduit 24. The priority spool 92 is forced inwardly compressing priority spool spring 114 permitting fluid to pass directly into discharge passage 104. This happens as long as the isolator valve 42 remains open and the secondary work circuit 32 requires fluid. If the secondary work circuit does not require fluid there will be no flow through the orifice 36 or the isolator valve 42 and consequently there will be no pressure drop through orifice 36 and the priority spool 92 will remain seated blocking flow to discharge passage 104.

During low pressure steering a signal will enter the isolator valve 42 through steering signal line 54 forcing the isolator valve spool 116 inwardly closing the isolator valve outlet ports 102 blocking flow from the orifice 36. With no flow through the orifice there is no pressure drop and the priority spool spring 114 will force the spool to the right closing off the flow to discharge passage 104. If the secondary circuit requires higher pressure than does the steering circuit the higher variable displacement pump pressure will overcome the steering signal in line 54 and the isolator valve 42 will open initiating flow through the orifice 36 thus reestablishing the pressure drop and permitting the priority spool 92 to be displaced and allow passing of fluid directly to discharge passage 104 and on to the secondary circuit 32.

When steering pressure is higher than the pressure required by the secondary circuit the variable displacement pump pressure may still overcome the steering signal (line 54) as the isolator valve spring 120 and priority spool spring 114 are not strong enough to overcome the 250 psi differential between the steering signal and the variable displacement pump output. The priority valve will monitor the pressure and if flow to the secondary circuit attempts to reduce system pressure below that required by steering, the combined efforts of the steering signal on line 54 and the isolator valve spring will partially close the isolator valve 42 which will restrict the flow through orifice 36 resulting in reduced pressure drop so the priority valve spring will partially close the priority valve restricting fluid flow to the secondary circuit.

When the steering is turned as far as possible against a stop (not shown) and held there, the system pressure will go up to the maximum pressure (2500 psi in this example). The steering signal line 54 pressure will also be at 2500 psi so the isolator valve 42 will be closed and cannot be overcome by system pressure to open the priority spool 92 as it would during normal steering explained above. It would be impossible to operate the secondary circuit under these conditions if some means were not provided to open the priority valve. The relief valve 44 serves this purpose.

Circuitry concerning the relief valve is the crux of this invention and distinguishes this invention from the prior art referring to FIG. 2.

When the steering pressure reaches a predetermined value the relief valve 44 will open permitting fluid to flow through the orifice 36 through the relief valve passage 110 and on to the secondary circuit 32 via passage 100 and discharge passage 104. The pressure drop resulting from flow through the orifice 36 causes the priority spool 92 to be displaced past annular orifice 106 allowing flow to the discharge passage 104. If flow to the secondary circuit causes system pressure to drop below the relief valve setting the relief valve 44 will close stopping flow through the orifice 36 causing the priority spool to close and reestablish system pressure.

In practice, the relief valve 44 monitors pressure while the priority spool restricts flow so the system pressure is maintained. The actual pressure setting of the relief valve is not critical. The minimum allowable setting is limited by the fact that the total pressure settings of the priority spool spring 114 and the relief valve setting should be greater than the maximum pressure required for actual steering in the priority circuit.

The uniqueness of the relief valve 44 is that it reads the pressure behind the priority spool and relieves this pressure to the secondary work circuit through passage 100 but does not sense the pressure in the secondary work circuit and is uneffected by it. Most relief valves discharge to tank wasting high pressure flow, energy, and generating heat. This was the case in prior art relief valves in load sensitive steering systems.

Note that passage 112 does go to reservoir 12b, but this is just to relieve leakage into the spring chamber of the bore 132 of the relief valve.

Also, orifices feeding relief valves in prior art devices would have to be kept small to reduce losses of high pressure flow. The relief valve used herein wastes very little energy as a maximum pressure drop across it is 50 psi (for example) at a low flow rate through the orifice 36. When the flow increases sufficiently to develop a 50 psi pressure drop through the orifice the priority spool will be displaced and allow flow. There will be a 50 psi pressure drop past the priority spool and the 50 psi pressure drop through the orifice in parallel with the priority spool and no pressure drop through the relief valve. Because the flow through the orifice is in parallel with the flow past the priority valve spool there is no additional power loss through the orifice and the orifice can be kept large.

The most important advantage in discharging the relief valve to the secondary work circuit, in addition to conserving power, is that this design eliminates kickback and recoil in the steering hand pump. By discharging the relief valve 44 and the flow through the isolator valve 42 to the secondary circuit there will not be flow through these valves if the secondary work circuit does not require flow. If there is no flow through the relief or isolator valves there will be no flow through the orifice 36 and the priority spool 92 will not be displaced. If a valve in the secondary work circuit is suddenly opened the priority spool valve will open quickly enough. If, however, the isolator valve 42 and the relief valve 44 discharged to tank, flow through these valves would cause the priority spool valve to open even through no flow was required for the secondary circuit. If a valve in the secondary work circuit 32 were then opened the priority spool valve 40 would have to close in order to properly monitor flow and pressure. The passage 96 behind the priority spool 92 would have to be refilled with fluid displaced by the spool and this fluid can be replaced only by flow through the orifice 36. To conserve energy the orifice would have to be small and the priority valve spool 92 would not be able to close fast enough to prevent a drop in system pressure. If the vehicle operator was holding the steering against its stop, the system would be at maximum pressure. If the valve in the secondary work circuit were opened to a high flow, low pressure requirement, the priority spool would be unable to close fast enough to prevent a significant drop in system pressure. If the supply of pressure to the steering hand pump 60 becomes less than the pressure in the hand pump the hand pump will motor backwards causing the operator to feel objectionable kickback at the steering wheel 142.

Scrutiny of the circuit operation would reveal that if the secondary circuit were opened while the steering cylinder was dead headed — relief valve open — there would be a pressure drop in the steering circuit causing the relief valve to close which in turn would cause the priority valve to close. In order to close the priority valve, the hydraulic fluid behind it must be replaced and must pass through the orifice. The delay in closing results in a momentary pressure drop in the steering circuit causing the hand pump to motor backwards — i.e., kickback.

Because the orifice 36 discharges its flow to the secondary work circuit through the isolator valve 42 or relief valve 44, it represents no additional power loss and can be made fairly large as long as its flow does not exceed the capacity of the isolator or relief valve. Additionally, the larger orifice is resistant to plugging and is easier to manufacture.

The priority dependent system, in the example above — the steering system, may alternatively be a hydraulic brake system, a hitch control hydraulic system or other typical priority necessitating systems. Also the system described above could be used for other types of vehicles and could even be applicable to certain stationary hydraulic systems and installations. Thus, it is apparent that there has been provided in accordance with the invention a flow responsive or load sensitive hydraulic system that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In a variable displacement hydraulic system having a variable displacement pump, a compensating circuit for effecting the displacement of said pump, a priority dependent work circuit, a secondary work circuit having a fluid delivery conduit and a flow compensating priority valve system including an orifice metering flow into said fluid compensating priority valve, a priority spool valve upstream of said orifice which when open allows fluid flow via a discharge passage to said secondary work circuit, an isolator valve downstream of said priority valve and said orifice which when opened allows fluid flow via a passage to said discharge passage and to said secondary work circuit, said flow compensating priority valve further including a relief valve downstream of said priority valve which when opened allows fluid flow to said secondary work circuit.

2. In a flow compensated hydraulic system having a variable displacement pump, a priority dependent work circuit and a secondary work circuit, a flow compensating priority valve comprising:
   a valve body having a plurality of bores including s first passage and a discharge passage communicating with said first passage therein;
   a priority valve spool carried in the first passage of said valve body having an orifice allowing restricted fluid flow through said priority valve spool integral therewith;
   a priority spool spring urging said priority valve spool to an undisplaced position of repose;
   an isolator valve having an outlet port and a pilot signal port carried in said first passage and an isolator valve spool urged to a position blocking said outlet port by an isolator valve spring;
   a relief valve responsive to pressure in said first passage allowing fluid to flow from said first passage via said discharge passage to said secondary work circuit.

3. The invention in accordance with claim 2 wherein said relief valve will open responsive to pressure in said first passage allowing fluid, supplied by said variable displacement pump, to flow to said secondary work circuit via said discharge passage when said priority spool is at a position of repose and said isolator valve spool is urged to a position blocking said outlet port by said isolator valve spring.

4. The invention in accordance with claim 2 wherein said relief valve comprises:
   a relief valve body having a bore therethrough and at least one aperture;
   a relief valve spool residing in said bore of said body;
   a relief valve spring residing in said bore of said body urging said relief valve spool to a position of rest in said bore;
   a stop pin carried in said bore of said body preventing complete compression of said relief valve spring when said relief valve spool is urged from its position of rest by fluid pressure in said bore of said body;
   a first relief valve port allowing fluid to flow out of said bore to said secondary work circuit when said relief valve spool is urged from its position of rest by fluid pressure in said bore of said body.

5. The invention in accordance with claim 3 wherein said apertures of said relief valve body may comprise:
   a leakage drain port allowing fluid that has leaked past the relief valve spool to pass from the bore of said relief valve body.

6. In a flow compensated hydraulic system, having a variable displacement pump, a priority dependent work circuit and a secondary work circuit, a flow compensating priority valve comprising:
   a valve body having a plurality of bores including a first passage and a discharge passage therein;
   a priority valve spool carried in the first passage of said valve body;
   a priority spool spring urging said priority valve spool to an undisplaced position of repose;
   a flow metering orifice integrally formed in said first passage of said valve body;
   an isolator valve having an outlet port for allowing fluid to flow to a secondary work circuit and a pilot signal port carried in said first passage and an isolator valve spool urged to a position blocking said outlet port by an isolator valve spring;

a relief valve responsive to pressure in said first passage allowing fluid to flow from said first passage via said discharge passage to said secondary work circuit.

7. The invention in accordance with claim 6 wherein said relief valve will open responsive to pressure in said first passage allowing fluid, supplied by said variable displacement pump, to flow to said secondary work circuit via said discharge passage when said priority spool is at a position of repose and said isolator valve spool is urged to a position blocking said outlet port by said isolator valve spring.

* * * * *